Jan. 13, 1970  J. V. WATSON  3,489,235

HYDRAULIC CONTROL SYSTEMS FOR CRAWLERS

Filed Oct. 3, 1967

INVENTOR.
John V. Watson
BY
Wofford & Felsman
ATTORNEYS

United States Patent Office 3,489,235
Patented Jan. 13, 1970

3,489,235
HYDRAULIC CONTROL SYSTEMS
FOR CRAWLERS
John V. Watson, Fort Worth, Tex., assignor to Watson
Manufacturing Company, Fort Worth, Tex.
Filed Oct. 3, 1967, Ser. No. 672,523
Int. Cl. B62d 11/00, 11/22
U.S. Cl. 180—6.48                                    9 Claims

ABSTRACT OF THE DISCLOSURE

Following is disclosed a hydraulic system used to control crawler operations. A pair of three position throttling control valves carried on a rotatable platform control the flow of fluid through a rotatable swivel and within the crawler carriage, selectively directing fluid into either of two inlet passages associated with respective hydraulic motors to drive them independently forward or backward. The output shaft of each motor is in direct drive relationship with a sprocket connected through a chain with a second sprocket to drive the endless track. A hydraulic circuit connected with the valve and with the pump maintains a selected pressure on each motor to prevent cavitation. Moreover, fluid flow diodes prevent fluid flow reversal against the pump when the motor is converted into a pump, as when rolling down hill, for example. The fluid in the circuit functions as a brake, eliminating the need for a separate brake system.

BACKGROUND AND GENERAL DESCRIPTION

Previously, crawlers used for large portable equipment, such as earth working equipment, have generally utilized gear train drive systems, making independent control of the crawler tracks difficult. Previously known hydraulic systems have not satisfactorily overcome the problems and disadvantages associated with gear train drive systems. One of my purposes is to provide a control system which eliminates the need for gear reduction units. In addition, it is my purpose to provide a control system which enables continuous 360 degree rotation of the upper rotatable member. Further, it is my purpose to provide completely independent control of either track of the crawler, including the ability to operate them at differential speeds, reverse or brake them individually. The control system functions as a brake means to eliminate the necessity for a separate brake system. Moreover, the system includes means to prevent cavitation in the hydraulic motors used to drive the tracks.

DESCRIPTION OF A PREFERRED EMBODIMENT

Figure 1:
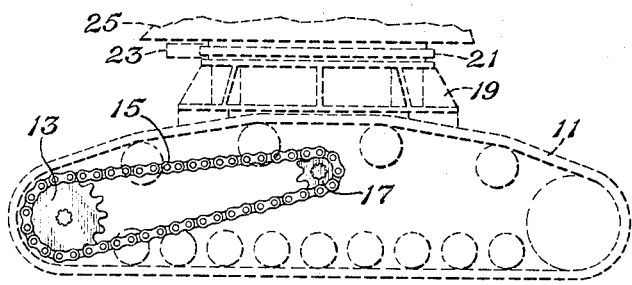
FIG. 1 is a schematic side elevation view of a typical crawler of the type used in earth working operations.

The numeral 11 in FIG. 1 of the drawing designates one of two endless tracks, each of which is driven by a sprocket 13 connected by means of a chain 15 to a drive sprocket 17. A carriage 19 supported by the endless tracks 11 has in this instance a bull gear 21 secured to its upper region. A pinion 23 driven by a motor (not shown) and secured to a rotatable platform 25 is adapted to rotate the platform about an axis that is vertical relative to the carriage.

Figure 2:
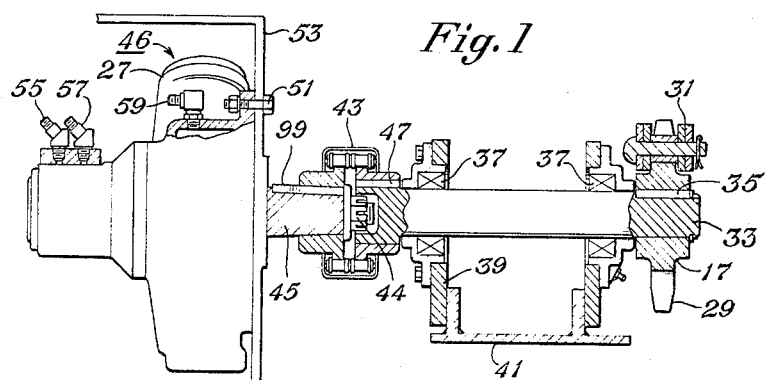
FIG. 2 is a side elevation view, partially in section, of a hydraulic motor, drive sprocket, and interconnecting linkage constructed in accordance with the principles of my invention.

The drive sprocket 17 is in direct drive relationship with a high torque hydraulic motor 27, as shown in FIG. 2. The sprocket 17 has a multiplicity of teeth 29 which each engage individual links 31 of the chain 15. The sprocket is maintained in this instance in a selected relationship with a shaft 33 by means of a key and keyway 35. The shaft 33 is supported by bearings 37, and by bearing supports 39, to a member 41 secured to carriage 19. A coupling 43 secures the shaft 33 to the output shaft 45 of a high torque hydraulic motor with assistance from the fastener 44, as well as keys and keyways 47, 49. The motor may be of the hydraulic vane type sold by Vickers, Inc., such as their model MHT–250–10, 1967 or a Staffa Mark IV. The motor is mounted by fasteners 51 to a supporting plate 53 that has two inlet (or outlet) ports 55, 57, one for driving the motor in a forward direction and the other for reversing it. An additional outlet port 59 enables lubricating leakage fluid to return to its source, such fluid being used to lubricate the bearings in the crankcase of the motor.

Figure 4:
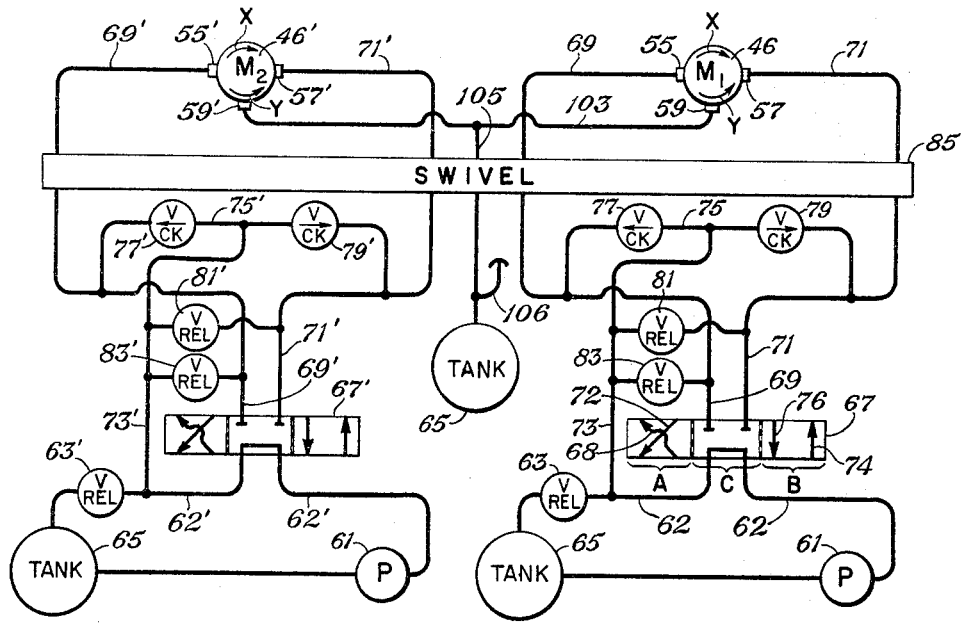
FIG. 4 is a circuit diagram showing a preferred relationship between the various hydraulic elements of the system.

A preferred hydraulic circuit is illustrated in FIG. 4. Referring initially to only the right-hand side of the circuit, the pump 61 is connected by a passage 62 in series with a tank 65 and with a back pressure valve 63 adapted to maintain at least sixty-five pounds of pressure in the system. Also, the pump is connected in series by passage 62 with a three position control valve 67. A first position A of the valve enables circulation of fluid through a port 68 of valve 67; through passage 69 which communicates with port 55 of motor 46 to drive its shaft in direction X; with a passage 71 through port 57 of the motor; through port 72 of the valve 67; and to tank 65 through passage 62. A second position B of the valve enables circulation of fluid through a port 74 of the valve; through passage 71; through motor 46 by port 57 to drive its shaft in direction Y; through passage 69 by port 55; through port 76 of the valve; and to tank 65 through passage 62. Thus, the motor 46 may be driven in either the forward or reverse direction.

With valve 67 in a third position C (called its "blocked" position) fluid may flow through passage 62; through a control valve by-pass line 73; and through a passage 75 communicating between two oppositely facing fluid flow diodes (here check valves) 77, 79 which communicate with the motor 46 through passages 69, 71 and ports 55, 57 to equalize the pressure across the motor. Should the motor be converted to a pump (as when the crawler is urged downhill under the force of gravity) fluid cannot be pumped backward through conduits 69, 71 (since these passages are blocked at valve 67) or past check valves 77, 79. Since fluid is now blocked in the circuit, it acts as a brake. Safety relief valves 81, 83 connected between passages 71 and 73 and between 69 and 73, preferably relieve pressure at about 2500 p.s.i., allowing maximum braking without danger of system failure through over pressurization since fluid flow resulting from the motor 46 being converted into a pump may increase system pressure only a limited degree. This will not interfere with effective braking, which generally will occur at a pressure of about 500 p.s.i.

Figure 3:
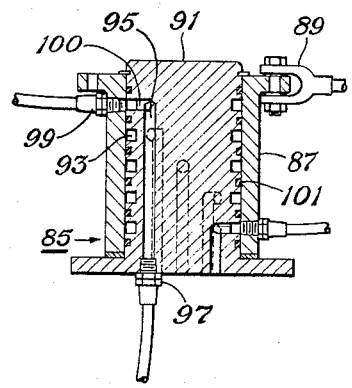
FIG. 3 is a side elevational view, partially in section, of a hydraulic swivel used to transmit fluid from the carriage to its rotatable platform.

Passages 69, 71 (and 69', 71') extend through the swivel 85 as may be seen in FIG. 3. The swivel has an outer rotatable housing 87 secured by an arm 89 to a portion of the rotatable platform 25. A stationary core 91 has a plurality of annular grooves 93 spaced axially along its outer surface, each of which intersects a selected axial passage 95 which extends through the core to an associated fluid fitting 97. Additional fluid fittings 99 communicate with a respective groove 93 and then to a passage 95 through a radial passage 100 formed in housing 87. Seal means such as O-rings 101 are spaced in suitable grooves on each side of each annular groove 93 to engage and seal against the interior surface of the housing 87. Consequently, fluid may flow through an axial passage 95 in the stationary core 91, through one of its radial hole 100, angular groove 93 and out through the housing 87.

The outlet ports 59, 59′ of the motors 46, 46′ are connected by a passage 103 which communicates with tank 65 through passage 105 (and swivel 85) vented as indicated by the numeral 106. Each track of the carriage is driven by the illustrated identical hydraulic circuits connected as illustrated in FIG. 4, each component of which is designated in the drawing by like numerals where they may be the same component, or designated by prime numbers where they are different but identical components.

In operation the valve 67 may be in its blocked position C as shown in FIG. 4. If so, fluid may circulate between the pump 61, back pressure valve 63, and to tank 65, and in addition, pressurizes the fluid in passage 73 and passage 75, check valves 77, 79 and both sides of the motor 46 through passages 69, 71. The fluid in such instance communicates through the swivel 85 as previously explained, thereby permitting continuous three hundred sixty degree rotation of the rotatable platform 25. With the valve in the blocked position rotation of the motor 46 is prevented as previously explained, and further, should the motor be converted to a pump (as when the crawler starts to roll downhill, for example) the check valves 77, 79 will prevent fluid flow back to the tank 65. Therefore, the crawler is prevented from moving by the effective operation of the system for braking. Moreover the back pressure valve 63 maintains a selected pressure across the motor 46, preventing cavitation.

If the three position valve is moved to the left as viewed in FIG. 4 to position B to enable fluid to flow from the pump 61 into the passage 71, then the shaft of motor 46 will be driven in direction Y since the fluid flows to it from passage 71 and from it through passage 69, ultimately returning to the tank 65 through back pressure valve 63. Simultaneously, check valves 77, 79 prevent fluid flow from the motor through passages 75, 73 toward the tank 65 or pump 61, thus forcing the fluid flow to pass through the motor 46. To reverse the direction of the motor, the three position valve 67 is moved to the right as viewed in FIG. 4 to position A, causing the fluid to flow from pump 61 into passage 69, through motor 46 to drive its shaft in direction X, through passage 71 and ultimately to the tank 65 through the back pressure valve 63. The control valve 67 may be throttled and thus the speed of the motor may be conveniently controlled. Consequently, fluid flow to either motor 46 or 46′ may be independently throttled to slow the motor down or may be completely blocked to stop rotation.

It should be apparent from the foregoing that I have provided an invention having significant advantages. Such a system has direct drive between hydraulic motor and sprocket while enabling individual and differential control over each track. The direction of rotation of one track may be conveniently reversed relative to the rotation of the other in a convenient manner. This simplifies steering and adds significantly to the safety of operation. By maintaining a selected pressure across the motor and pressurization of fluid in the motor, even when the control valve is in the blocked position, cavitation in the motor is prevented in instances when it is converted to a pump. This adds significantly to the life of the motor and prevents loss of operating time through maintenance. When the control valve is position to drive the motor forward or backward, the utilization of additional pressure control means of a higher value enables effective braking while simultaneously protecting the system from damage. With the above system, the crawler will operate even in deep water. The swivel arrangement enables three hundred sixty degrees rotation of the platform while simultaneously enabling complete and independent control over the tracks.

While I have shown my invention in only one of its forms it should be apparent to those skilled in the art that it is not so limited but is susceptible to various changes and modifications without departing from the spirit thereof.

I claim:

1. A hydraulic power and control system for crawlers having rotatable platforms supported on track mounted carriages, said system comprising:
- a separate drive means to rotate each track;
- a reversible hydraulic motor supported by the carriage in drive relationship with each said drive means;
- pump means for urging fluid through said motors;
- three position control valve means connected with and carried by said rotatable platform and interposed between said pump means and each motors to drive each said motor forward, reverse it, or block fluid flow therefrom; and
- a vertical, multi-passage swivel means interposed between the rotatable platform and carriage and between each said valve and said pump means to transfer fluid between said motor and said control valve means, said swivel having a plurality of radial, sealed grooves between an outer sleeve and an inner core, each radial groove communicating with an axial groove extending through said core.

2. A hydraulic power and control system for crawlers having rotatable platforms supported on track mounted carriages, said system comprising:
- a drive sprocket to rotate each said track;
- a reversible high torque hydraulic motor supported by the carriage in direct drive relationship with each said sprocket;
- a swivel having a plurality of radial, sealed grooves between an outer sleeve and an inner core, each radial groove communicating with an axial groove extending through said core;
- a three position control valve connected through two separate inlet passages with said motor, one position urging fluid through said passages in a direction to drive the motor forward, the second position blocking fluid flow through the valve, and the third position reversing the fluid flow through the motor;
- pump means communicating with said valve;
- check valves disposed on either side of a control valve by pass line and connected with respective inlet passages of each said motor to prevent back flow against said pump when the motor is converted to a pump.

3. A hydraulic power and control system for crawlers having rotatable work platforms, supported on track mounted carriages, said system comprising:
- a drive sprocket to rotate each said track;
- a reversible high torque hydraulic motor supported by the carriage in direct drive relationship with each said sprocket means;
- a swivel having a plurality of radial, sealed grooves between the outer sleeve and the inner core, each radial groove communicating with an axial groove extending through said core;
- a three position control valve connected through two separate inlet passages with said motor, one position urging fluid through said passages in a direction to drive the motor forward, the second position blocking fluid flow through the valve, and the third position reversing the fluid flow through the motor;

pump means communicating with said valve;

a back pressure valve of selected rating communicating with said pump and with said control valve to control pressure on each side of said pump to prevent cavitation.

4. The system defined by claim 1 which further comprises:

check valves disposed on either side of a control valve by pass line and connected with respective inlet passages of each said motor to prevent back flow against said pump when the motor is converted to a pump; and a pressure relief valve of selected rating communicating with said pump and with said control valve to control pressure on each side of said pump to prevent cavitation.

5. The system defined by claim 4 which further comprises a safety relief valve communicating between said by-pass line and each inlet passage of the motor such that when said valve is positioned to block forward or backward motor rotation, said safety relief valve prevents hydraulic pressure overload of the system while enabling effective braking.

6. A hydraulic power and control system for crawlers having rotatable platforms supported on track mounted carriages, said system comprising:

a drive means supported on the carriage to rotate each said track;

a reversible hydraulic motor supported by the carriage in direct drive relationship with each said drive means;

a swivel carried between the carriage and the platform and having a plurality of radial, sealed grooves between an outer sleeve and an inner core, each radial groove communicating with an axial groove extending through said core;

a three pisition control valve connected through said swivel with two separate inlet passages with each said motor, one position urging fluid through said passages in a direction to drive the motor forward, the second position blocking fluid flow through the valve, and the third position reversing the fluid flow through the motor;

pump means communicating with said valve;

a control valve by-pass line communicating between the pump means and both sides of each said motor, and check valves disposed on either side of each control valve by-pass line and connected with respective inlet passages of each said motor to prevent back flow against said pump when the motor is converted to a pump.

7. The system defined by claim 6 which further comprises:

a pressure relief valve of selected rating communicating between each pump and each control valve to control pressure on each side of said pump to prevent cavitation.

8. The system defined by claim 7 which further comprises a safety relief valve communicating between said by-pass line and each inlet passage of the motor such that when said valve is positioned to block forward or backward motor rotation, said safety relief valve prevents hydraulic pressure overload of the system while enabling effective braking.

9. A hydraulic power and control system for crawlers having rotatable work platforms, supported on track mounted carriages, said system comprising:

a drive means supported on the carriage to rotate each said track;

a reversible hydraulic motor supported by the carriage in direct drive relationship with each said drive means;

a swivel carried between the carriage and the platform and having a plurality of radial, sealed grooves between the outer sleeve and the inner core, each radial groove communicating with an axial groove extending through said core;

a three position control valve connected through two separate inlet passages with said motor, one position urging fluid through said passages in a direction to drive the motor forward, the second position blocking fluid flow through the valve, and the third position reversing the fluid flow through the motor;

pump means communicating with said valve;

a back pressure valve of selected rating communicating with said pump and with said control valve to control pressure on each side of said pump to prevent cavitation.

References Cited

UNITED STATES PATENTS

| | | | |
|---|---|---|---|
| 1,313,219 | 8/1919 | Jackson | 180—6.48 X |
| 2,393,324 | 1/1946 | Joy | 180—6.48 |
| 2,791,285 | 5/1957 | Linander | 180—6.58 |

LEO FRIAGLIA, Primary Examiner

J. A. PEKAR, Assistant Examiner

U.S. Cl. X.R.

180—6.58